US012678910B2

(12) United States Patent
Oag et al.

(10) Patent No.: US 12,678,910 B2
(45) Date of Patent: Jul. 14, 2026

(54) MANDREL FOR USE IN THE MACHINING OF OPHTHALMIC LENSES

(71) Applicant: CooperVision International Limited, Fareham (GB)

(72) Inventors: Robert Oag, Southampton (GB); David Ricketts, Southampton (GB); Robert Turner, Chandler's Ford (GB); Edward James Harley Evans, Southampton (GB); Mark Chalmers, Bournemouth (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 19/118,365

(22) PCT Filed: Oct. 26, 2023

(86) PCT No.: PCT/GB2023/052807
§ 371 (c)(1),
(2) Date: Apr. 4, 2025

(87) PCT Pub. No.: WO2024/089434
PCT Pub. Date: May 2, 2024

(65) Prior Publication Data
US 2026/0008243 A1      Jan. 8, 2026

Related U.S. Application Data

(60) Provisional application No. 63/420,733, filed on Oct. 31, 2022, provisional application No. 63/420,256, filed on Oct. 28, 2022.

(51) Int. Cl.
*B24B 13/005*        (2006.01)
*B24B 13/00*         (2006.01)
(Continued)

(52) U.S. Cl.
CPC ........ *B24B 13/005* (2013.01); *B24B 13/0025* (2013.01); *B29D 11/00038* (2013.01); *B29D 11/00932* (2013.01); *G02C 7/04* (2013.01)

(58) Field of Classification Search
CPC .............. B24B 13/005; B24B 13/0025; B24B 13/0052; B29D 11/00038; B29D 11/00932; G02C 7/04
(Continued)

(56) References Cited

U.S. PATENT DOCUMENTS 3,140,568 A * 7/1964 Beasley ................ B24B 13/005
                                                            451/390
4,647,261 A * 3/1987 Schaffner ................ B29C 37/02
                                                            408/180
(Continued)

FOREIGN PATENT DOCUMENTS

JP        2004314288 A      11/2004
WO          9409946 A1       5/1994
WO      2024089433 A1       5/2024

OTHER PUBLICATIONS

International Search Report and Written Opinion issued in corresponding International Patent Application No. PCT/GB2023/052807 dated Dec. 19, 2023 (17 pages).
(Continued)

*Primary Examiner* — Bumsuk Won
*Assistant Examiner* — Seth D Moser
(74) *Attorney, Agent, or Firm* — Kilyk & Bowersox, P.L.L.C.

(57)                ABSTRACT
A mandrel 1 for holding an ophthalmic lens member blank 16 during machining is disclosed. The mandrel 1 has a front surface 6 for receiving an ophthalmic lens member blank 16 to be machined. The front surface 6 comprises a planar surface region 10; a curved surface region 8; and a drainage channel 12 located between the curved surface region 8 and
(Continued)

the planar surface region 10 such that wax applied to the curved surface region 8 flows into the drainage channel 12. A kit of parts comprising such a mandrel 1, a method of mounting an ophthalmic lens member blank 16 for machining, a method of machining an ophthalmic lens member blank 16, an ophthalmic lens produced using the apparatus and a batch of such lenses are also disclosed.

19 Claims, 6 Drawing Sheets

(51) Int. Cl.
B29D 11/00 (2006.01)
G02C 7/04 (2006.01)
(58) Field of Classification Search
USPC ......................... 351/159.01, 159.73; 451/390
See application file for complete search history.

(56) References Cited

U.S. PATENT DOCUMENTS

| | | | | |
|---|---|---|---|---|
| 5,494,474 | A | * | 2/1996 | Vernon ................. B24B 13/005 |
| | | | | 451/364 |
| 5,919,563 | A | | 7/1999 | Parish, Jr. et al. |
| 6,224,467 | B1 | | 5/2001 | Tanaka et al. |
| 9,266,294 | B2 | * | 2/2016 | Widman ................. B33Y 70/00 |
| 2009/0231688 | A1 | | 9/2009 | Shyu et al. |
| 2016/0101579 | A1 | * | 4/2016 | Benz ........................ B23C 3/00 |
| | | | | 156/60 |
| 2017/0131571 | A1 | * | 5/2017 | Waite .............. B29D 11/00134 |
| 2021/0094251 | A1 | * | 4/2021 | Bruce ............... B29D 11/0073 |
| 2025/0108470 | A1 | | 4/2025 | Ricketts et al. |
| 2025/0244611 | A1 | * | 7/2025 | Oag ................... B29D 11/0073 |

OTHER PUBLICATIONS

PCT Demand filed Jun. 20, 2024 in corresponding International Patent Application No. PCT/GB2023/052807 (20 pages).
Second Written Opinion issued in corresponding International Patent Application No. PCT/GB2023/052807 dated Aug. 2, 2024 (8 pages).
Response to Second Written Opinion filed Sep. 26, 2024 in corresponding International Patent Application No. PCT/GB2023/052807 (11 pages).
International Preliminary Report on Patentability issued in corresponding International Patent Application No. PCT/GB2023/052807 dated Feb. 13, 2025 (14 pages).

* cited by examiner

MANDREL FOR USE IN THE MACHINING OF OPHTHALMIC LENSES

This application is a National Stage Application of PCT/GB2023/052807, filed Oct. 26, 2023, which claims priority to U.S. Patent Application Nos. 63/420,256, filed Oct. 28, 2022 and 63/420,733, filed Oct. 31, 2022.

The present disclosure concerns a mandrel for use in the machining of ophthalmic lenses, more particularly, but not exclusively, contact lenses. The disclosure concerns a mandrel for holding an ophthalmic lens member blank during machining, a kit of parts comprising such a mandrel, a method of mounting an ophthalmic lens member blank on a mandrel, a method of machining an ophthalmic lens member blank and an ophthalmic lens comprising a lens member machined using such a mandrel and/or method.

BACKGROUND

Ophthalmic lenses are often produced by machining an ophthalmic lens blank, for example to provide a desired shape or surface finish. A high degree of accuracy in such operations is necessary in order to ensure the finished lens has the required properties. A mandrel is used to hold the ophthalmic lens blank during machining, for example to mount the lens blank on a lathe for cutting, or to hold the lens blank during polishing or grinding.

Typically, a block of wax is provided on a front surface of the mandrel, and the lens blank is pushed into the wax which then sets and holds the lens blank in place. It is difficult to obtain accurate placement of the lens blank on the wax and a consistent thickness of the wax. This can lead to machining errors as a result of the lens blank being out of position or tilted relative to the mandrel. The wax can also leave residue on the surface of the lens that produces a hazy or cloudy effect on the surface and thereby impacts the optical performance of the lens (or necessitates additional process steps to remove that residue). It would be advantageous to provide a way of holding an ophthalmic lens blank during machining that reduced machining errors and/or provided a lens having an improved optical performance.

Recently, ophthalmic lens assemblies in which optical components are contained within the lens have been proposed. Examples of optical components include diffractive optical elements, and electrically-switchable components, including liquid crystal cells. Such assemblies can be produced by encapsulating the optical components between a first lens member and a second lens member. The first and second lens member may between them define the anterior and posterior surfaces of the lens, or the first and second lens member may define an encapsulation component that is subsequently encapsulated within lens material to form the anterior and/or posterior surfaces of the lens. It would be advantageous to provide an efficient way of machining such lens assemblies. Such assemblies may require more accurate machining in order to achieve the required dimensions in view of the number of components involved (e.g. in view of tolerance stacking) and/or may require a higher level of precision in machining in order to allow the optical components to provide the required effects. More accurate machining techniques may therefore be particularly advantageous when applied to such ophthalmic lens assemblies.

The present disclosure seeks to mitigate the above-mentioned problems. Alternatively or additionally, the present disclosure seeks to provide improved apparatus and/or methods for use in machining ophthalmic lenses.

SUMMARY

In a first aspect of the disclosure there is provided a mandrel for holding an ophthalmic lens member blank during machining, the mandrel having a front surface for receiving an ophthalmic lens member blank to be machined; the front surface comprising; a planar surface region; a curved surface region; and a drainage channel located between the curved surface region and the planar surface region such that wax applied to the curved surface region flows into the drainage channel.

In a second aspect of the disclosure there is provided a kit of parts comprising a mandrel according to the first aspect, the mandrel further comprising a socket in the front surface for receiving a center-piece, the kit of parts further comprising one or more of the following: a center-piece comprising a body having a convex body surface, the center-piece being configured to be received in the socket such that the convex body surface defines the curved surface region; a center-piece comprising a body having a concave body surface, the center-piece being configured to be received in the socket such that the concave body surface defines the curved surface region.

In a third aspect of the disclosure there is provided a method of mounting an ophthalmic lens member blank on a mandrel for machining, the mandrel having a front surface comprising a planar surface region, a curved surface region and a drainage channel, the method comprising applying wax to the curved surface region and placing the ophthalmic lens member blank on the wax thereby causing wax to flow into the drainage channel from the curved surface region.

In a fourth aspect there is provided a method of machining an ophthalmic lens member blank, the method comprising mounting the ophthalmic lens member blank on a mandrel in accordance with the method of the third aspect, and then mounting the mandrel on a machine tool and machining the ophthalmic lens member blank.

In a fifth aspect there is provided a batch of at least 1000 ophthalmic lens, each ophthalmic lens comprising at least one ophthalmic lens member machined using the mandrel of the first and/or second aspects, and/or produced using the method of the third of fourth aspects, said at least one ophthalmic lens member comprising an optic zone and a peripheral zone, the optic zone having an optical axis that is coaxial with a geometric axis of the lens member.

Optional but preferred features are set out in the dependent claims.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Example embodiments will now be described, by way of example only, with reference to the accompanying schematic drawings, of which.

DETAILED DESCRIPTION

Figure 1A:
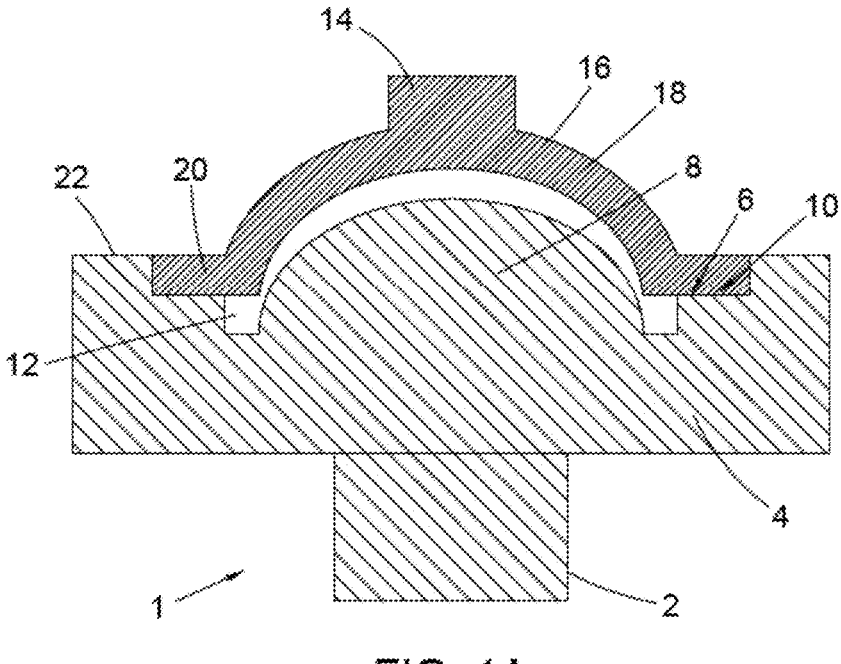
FIG. 1A shows a mandrel according to an embodiment of the disclosure.

According to a first aspect of the disclosure, there is provided a mandrel for holding an ophthalmic lens member blank during machining. The mandrel may have a front surface for receiving an ophthalmic lens member blank to be machined. The front surface comprises one or more of a planar surface region; a curved surface region; and a drainage channel located between the curved surface region and the planar surface region such that wax applied to the curved surface region flows into the drainage channel.

Thus, the front surface of the mandrel may comprise a planar surface region and a drainage channel extending along at least a portion of the boundary between the curved surface region and the planar surface region. The planar surface region may assist in accurately locating a lens member blank on the curved surface region, for example by a portion of the lens member blank abutting the planar surface region to reduce tilt and/or center the blank on the curved region. Additionally or alternatively, provision of a drainage channel may assist in accurately locating the lens member blank on the curved surface region by reducing and/or eliminating the flow of wax from the curved surface region to the planar surface region where the presence of wax could lead to misalignment between the lens member blank and the mandrel. Additionally or alternatively, reducing and/or preventing wax flowing onto the planar surface region may reduce the surface area of the lens member blank that contacts the wax, thereby reducing the area from which wax must subsequently be removed.

The front surface may be configured such that a first portion, for example a peripheral zone, of an ophthalmic lens member blank abuts the planar surface region while a second portion, for example an optic zone, of the ophthalmic lens member blank is received in or on the curved surface region. The curved surface region may be curved (e.g. non planar) over the majority of, for example the whole of, its surface area. The curved surface region may be centrally located on the front surface. The planar surface region may extend around the majority of, for example the whole of, the perimeter of the curved surface region. The planar surface region may be annular. The planar surface region may be concentric with the curved surface region. The planar surface region may be radially outside the curved surface region.

The curved surface region may be a convex surface region. It will be appreciated that as used herein the term 'convex surface region' refers to a region that is convex with respect to the planar surface region. The convex surface region may be convex over the majority of, for example the whole of, its surface area. It may be that the convex surface region comprises and/or defines a dome, for example a hemispherical dome. The convex surface region may be configured to be received in a concave recess defined by the posterior surface of an ophthalmic lens member blank, for example while the ophthalmic lens member blank abuts the planar surface region.

The curved surface region may be a concave surface region. It will be appreciated that as used herein the term 'concave surface region' refers to a region that is concave with respect to the planar surface region. The concave surface region may be concave over the majority of, for example the whole of, its surface area. It may be that the concave surface region comprises and/or defines a bowl, for example a hemi-spherical bowl. The concave surface region may be configured to receive a convex protrusion defined by the anterior surface of an ophthalmic lens member blank, for example while the ophthalmic lens member blank abuts the planar surface region.

The drainage channel may extend along a portion of, for example the majority of, for example the whole of, the (e.g. notional) boundary between the curved surface region and the planar surface region. Said drainage channel may be formed of a single continuous channel, or a plurality of discrete channels. The drainage channel may be annular. The drainage channel may be concentric with the curved surface region and the planar surface region, and located between the curved surface region and the planar surface region.

The mandrel may comprise a stem. The mandrel may comprise a flange extending radially from the stem, for example at one end of the stem. It maybe that a surface of the flange, for example the surface on the opposite side of the flange to the stem, defines the planar surface region.

The mandrel may comprise a center-piece. The center-piece may comprise a body which defines the curved surface region. The body may have a front body surface which defines the curved surface region. The body may have a rear surface that defines the base of the curved surface region. The radius of the body may decrease with distance from the base in the forward direction (e.g. away from the stem, if present). The center-piece may comprise a leg, extending from the body. The center-piece may be mounted on the rest of the mandrel via the leg. The rest of the mandrel, for example the flange and/or stem, may comprise a socket configured to receive an end portion of the leg, for example in an interference fit or in a threaded (screwed) relationship. The leg and/or the socket may be threaded such that the leg can be screwed into the socket. It may be that the width of the socket changes with distance along the longitudinal axis of the mandrel (i.e. the axis of rotation of the mandrel). The body may be received at least partially within the socket.

It may be that a portion of the drainage channel extends beneath the curved surface region. For example, a portion of the drainage channel may be located between the curved surface region and the flange (if present). Having a drainage channel that extends under the curved surface region may assist in retaining more wax in the drainage channel. It may be that the drainage channel has an opening on the front surface having a first width (width being measured in a radial direction) and the drainage channel at a position below the front surface has a second width, the first width being less than the second width.

It may be that with the center-piece mounted on the rest of the mandrel, the drainage channel is defined between the center-piece and the flange, for example between the body and/or leg and the flange. A portion of the drainage channel may extend under the body. It may be that the mandrel is configured such that when the leg is received in the socket to the maximum extent possible, the base of the body is spaced apart from the flange, thereby defining the drainage channel between the leg and the flange with the body overhanging the drainage channel.

The front surface may comprise one or more overflow channels extending, for example extending radially, from the drainage channel towards, for example to, the edge of the mandrel (e.g. the edge of the flange). Such overflow channels may allow excess wax to flow out of the drainage channel and therefore reduce the risk of overflow of wax from the drainage channel to the planar surface region.

It may be the curved surface comprises one or more grooves, for example has one or more grooves therein, for example machined therein, to retain wax. Such grooves may increase the amount of wax retained on the curved surface and thereby reduce the risk of wax overflowing from the drainage channel onto the planar surface. The groove(s) may be arranged in a spiral pattern on the curved surface or any other suitable pattern.

The term machining may refer to cutting, grinding, polishing and/or other machining processes. Examples of machine tools with which the present disclosure may find application include lathes, grinding machines, polishing machines and/or other machine tools.

In use, an ophthalmic lens member blank may be received on the front surface with the blank, for example the edges and/or peripheral zone of the blank, in an abutting relationship with the planar surface of the mandrel. In the case that the curved surface region is convex, the posterior surface of the lens member blank may define a recess in which the curved surface region is received. In the case that the curved surface region is concave, the anterior surface of the lens member blank may define a dome which is received in the bowl defined by the curved surface region.

It may be that the front surface of the mandrel comprises an optic zone and a peripheral zone. It may be that the optic zone of the front surface is centred on the front surface. The curved surface region may comprise, essentially comprise or consist of the optic zone. It may be that the mandrel is configured such that the optic zone of the front surface is aligned with the optic zone of a lens member blank and/or the curved surface region when said blank is received on the front surface. It may be that the peripheral zone of the front surface is radially outside the optic zone, for example the peripheral zone may be annular and surround the optic zone. The planar surface region may comprise, essentially comprise or consist of the peripheral zone. It may be that the mandrel is configured such that the peripheral zone of the front surface and/or the planar surface region is aligned with the peripheral zone of a lens member blank when said blank is received on the front surface.

The mandrel may comprise a stem for mounting the mandrel on a machine tool. The stem may comprise an elongate body configured to be received in the chuck of a machine tool. The mandrel may comprise a flange extending radially from the stem, for example at one end of the stem. The flange may comprise the front surface, for example the front surface being the surface of the flange on the opposite side of the flange to the stem. The diameter of the stem may be less than 50% of the diameter of the flange. The front surface may be substantially perpendicular (not withstanding any channels formed therein) to the stem.

The planar surface region of the mandrel may have an outer diameter from 4 mm to 20 mm inclusive, for example from 10 mm to 20 mm inclusive. The curved surface region of the mandrel may be substantially circular in shape and may have a diameter from 2 mm to 10 mm inclusive. In some embodiments, the planar surface region has an outer diameter from 13 mm to 15 mm, and the curved surface region has a diameter from 7 mm to 9 mm.

In a second aspect of the disclosure, there is provided a kit of parts comprising a mandrel having any of the features described above in connection with the first aspect. The mandrel may further comprise a socket in the front surface for receiving a center-piece. The kit of parts may further comprise one or more of the following: a center-piece comprising a body having a convex (dome-shaped) body surface, the center-piece being configured to be received in the socket such that the convex body surface defines the curved surface region of the front surface of the mandrel; a center-piece comprising a body having a concave (bowl-shaped) body surface, the center-piece being configured to be received in the socket such that the concave body surface defines the curved surface region of the front surface of the mandrel. Thus, the center-piece may be used to provide the convex or concave region of the front surface as described above in the first aspect. Such a reconfigurable mandrel/kit may provide increased efficiency of manufacture and/or ease of manufacture.

In a third aspect of the disclosure there is provided a method of mounting an ophthalmic lens member blank, for example a contact lens member blank, on a mandrel for machining. The mandrel may comprise a front surface having a planar surface region, a curved surface region and a drainage channel, the method comprising applying wax to the curved surface region and placing the ophthalmic lens member blank on the wax thereby causing wax to flow into the drainage channel from the curved surface region. It may be that wax from the curved surface region is retained by the drainage channel such that substantially no wax flows from the curved surface region to the planar surface region. Thus, it may be that the drainage channel prevents wax flowing from the curved surface region to the planar surface region.

The method may comprise placing the ophthalmic lens member blank on the wax with the planar surface region of the ophthalmic lens member blank abutting the planar surface region of the mandrel. The method may comprise pushing the ophthalmic lens member blank onto the wax until the blank abuts the planar surface region.

The method may comprise allowing the wax to set. The method may comprise releasing the hold on the lens member blank (e.g. after the wax has set) and the blank being retained by the wax.

In a fourth aspect of the disclosure, there is provided a method of machining an ophthalmic lens member blank, the method comprising mounting the ophthalmic lens member blank on a mandrel according to the method of the third aspect. The method may comprise mounting the mandrel (the blank being attached thereto by the wax) on a machine tool. For example, the mandrel may be mounted on the machine tool by inserting the stem of the mandrel into a chuck. The method may comprise machining the anterior surface and/or the posterior surface of the lens member blank. The method may comprise releasing the ophthalmic lens member blank (which may, if shaping has finished, be referred to as an ophthalmic lens member) from the mandrel, for example by melting the wax. The method may comprise carrying out further finishing steps on the ophthalmic lens member.

An ophthalmic lens member blank may have an anterior surface, being the front surface when the lens is in use on the eye. An ophthalmic lens member blank may have a posterior surface, being the rear surface when the lens is in use on the eye. The posterior surface may comprise a concave (e.g. bowl-shaped) region, for example surrounded by a planar region. The anterior surface may comprise a convex (e.g. dome-shaped) region, for example surrounded by a planar region. Either of the anterior or posterior surface may be positioned adjacent the front surface of the mandrel to enable machining of the other of the anterior or posterior surface. In this context, the surface of the lens member blank adjacent the front surface of the mandrel is referred to herein as the rear surface of the lens member blank, and the other surface of the lens member blank as the front surface. Thus, at different times the anterior surface of a blank may be referred to as the front surface and the rear surface, depending on the orientation of the blank on the mandrel. It may be that the mandrel has a convex (dome-shaped) curved surface region when the anterior surface of the lens member blank is being machined and the posterior surface is adjacent the front surface. It may be that the mandrel has a concave (bowl-shaped) curved surface region when the posterior surface of the lens member blank is being machined and the anterior surface is adjacent the front surface. Providing a front surface that conforms to the shape of the lens member blank being machined may provide improved accuracy in positioning the lens member on the mandrel.

The method may comprise applying wax and placing one of the anterior and posterior surfaces of the lens member blank against the front surface of a mandrel as described in the method of the third aspect, and then machining the other of the anterior and posterior surfaces (and optionally carrying out any of the other method steps described above with the lens member blank mounted on the mandrel in that orientation). The method may comprise removing the lens member blank from the mandrel after the machining of that surface is complete. The method may then be repeated to machine the other of the anterior and posterior surface of the same lens member blank. The method may comprise applying wax and placing a machined one of the anterior and posterior surfaces of the lens member blank against the front surface of a mandrel as described in the method of the third aspect, and then machining the other of the anterior and posterior surfaces (and optionally carrying out any of the other method steps described above with the lens member blank mounted on the mandrel in that orientation). The method may comprise removing the lens member blank from the mandrel after the machining is complete. Thus, the method may provide a method of mounting and/or machining a lens member blank to provide a lens member.

The method may comprise applying wax and placing the anterior of a first lens member blank against the front surface of a mandrel as described in the method of the third aspect, and then machining the posterior surface (and optionally carrying out any of the other method steps described above with the first lens member blank mounted on the mandrel in that orientation). The method may then comprise removing the first lens member blank from the mandrel after the machining of that surface is complete. The method may then comprise applying wax and placing the machined posterior surface of the first lens member blank against the front surface of a mandrel as described in the method of the third aspect. The method may comprise mounting one or more optical components on the first lens member blank, for example on the anterior surface of the lens member blank. The method may comprise affixing a second lens member blank on the first lens member blank. The method may then comprise machining the anterior surface of the second lens member blank while the second lens member blank is affixed to the first lens member blank and thereby held on the mandrel (and optionally carrying out any of the other method steps described above with the second lens member blank mounted on the mandrel in that orientation). Thus, the method may provide a method of mounting and/or machining a lens member assembly.

It may be that the machining comprises cutting, for example on a lathe, polishing or grinding, or any other machining operation where the lens must be held and supported.

In a fifth aspect of the disclosure, there is provided a batch of at least one thousand ophthalmic lenses, for example contact lenses. It may be that each lens comprises at least one ophthalmic lens member machined using the mandrel of the first and/or second aspects, and/or the method of the third and/or fourth aspects. It may be that each lens member (or lens) has an optic zone and a peripheral zone. The optic zone having an optical axis that is coaxial with a geometric axis of the lens member (or lens).

Prior art methods of machining a lens using wax to hold the lens member on a mandrel provide a high number of lenses with the optical axis misaligned with the geometric axis due to the lens member blank being misaligned with the axis of rotation of the mandrel. No known method that uses wax results in an error rate of less than 1 in 1000 lenses for these defects. Lenses produced using the mandrel of the present disclosure may avoid such defects by improving the accuracy and/or repeatability with which the lens member blank is positioned on the mandrel.

It will be appreciated that the lenses of a batch are sequentially produced. As used herein 'sequentially produced' means the batch is composed of lenses produced one after another without any intervening lenses which do not form part of the batch.

The optical axis may be defined as the axis about which the optic zone is rotationally symmetric. The geometric axis may be defined as the axis about which the edge of the lens or lens member is rotationally symmetric.

The ophthalmic lens member may have a convex or concave surface region having a wax residue thereon. The ophthalmic lens member may have a planar surface region, on the same side of the member as the convex or concave surface wherein the planar surface region does not have wax residue thereon. It may be that the perimeter of the region having wax residue is defined by the drainage channel. The ophthalmic lens may comprise an ophthalmic lens member assembly comprising an ophthalmic lens member machined using the mandrel of the first and/or second aspects, and/or the method of the third and/or fourth aspects, and having any of the other features of an ophthalmic lens member assembly as described above.

The ophthalmic lens may comprise a central optic zone and an annular peripheral zone surrounding the central optic zone. It may be that said wax residue is located in the optic zone.

The ophthalmic lens may comprise one or more optical components, for example diffractive optical elements, and electrically-switchable components, including liquid crystal cells. The ophthalmic lens may comprise one or more optical components located between first and second ophthalmic lens members. One or both of the first and second ophthalmic lens member may be machined using the mandrel of the first and/or second aspects, and/or the method of the third and/or fourth aspects.

The ophthalmic lens may comprise an ophthalmic lens member produced by machining an ophthalmic lens member blank using the methods and apparatus of the present disclosure. The ophthalmic lens may comprise a lens member blank machined on its anterior surface (i.e. the front surface when in use on the eye) and/or its posterior surface (i.e. the rear surface when in use on the eye). The ophthalmic lens may comprise a single lens member blank machined on its anterior surface and/or its posterior surface. Alternatively, the ophthalmic lens may comprise a two (or more) lens member blanks, each blank being machined on its anterior surface and/or its posterior surface. The ophthalmic lens may comprise a first lens member machined on its posterior surface and a second lens member machined on its anterior surface, for example wherein the second lens member is affixed to the first lens member, optionally, with one or more optical components located therebetween. In some embodiments, said first and second lens members define an encapsulation component, that is itself then encapsulated within lens material to form the lens. In other embodiments, the ophthalmic lens may be formed by the first and second lens members only.

The optic zone of a lens or lens member may be centred on the optical axis. The optic zone of a lens or lens member encompasses the parts of the lens that have optical functionality in use. The optic zone may be configured to be positioned over or in front of the pupil of an eye when in use. In plan view, a lens or lens member may have an optic zone surrounded by a peripheral zone. The peripheral zone is not part of the optic zone, but sits outside the optic zone. The peripheral zone may sit above the iris when the lens member is worn. The peripheral zone may provide a mechanical function, for example, increasing the size of the lens member thereby making the lens easier to handle. The peripheral zone may extend to the edge of the lens or lens member. The peripheral zone may provide ballasting to prevent rotation of the lens member, and/or providing a shaped region that improves comfort for the lens wearer.

As used herein, an ophthalmic lens may be a spectacle lens or a contact lens. A lens may comprise one or more lens members produced by machining one or more lens member blanks. A contact lens may comprise one or more contact lens members produced by machining one or more contact lens member blanks.

A contact lens may be a rigid contact lens or a soft contact lens such as a hydrogel contact lens or a silicone hydrogel contact lens. Thus, the ophthalmic lens member blank may be a contact lens member blank, for example a rigid contact lens member blank or a soft contact lens member blank such as a hydrogel contact lens member blank or a silicone hydrogel contact lens member blank. As used herein, the term contact lens refers to an ophthalmic lens that can be placed onto the anterior surface of the eye. It will be appreciated that such a contact lens will provide clinically acceptable on-eye movement and not bind to the eye of a person.

The contact lens may be for correcting or improving vision associated with myopia, presbyopia, hyperopia, astigmatism or another refractive anomaly. The contact lens may be a soft contact lens, such as a hydrogel contact lens or a silicone hydrogel contact lens. The contact lens may be a rigid gas permeable contact lens. The contact lens may be a scleral contact lens.

The contact lens (and therefore the contact lens member blank(s)) may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens (and therefore the lens member blank(s)) may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

Alternatively, the lens (and therefore the lens member blank(s)) may comprise polymethyl methacrylate (PMMA).

The contact lens or contact lens member blank may be substantially circular in shape. The contact lens/lens member blank may have a diameter from 4 mm to 20 mm inclusive, for example from 10 mm to 20 mm inclusive. The optic zone of the contact lens/blank may be substantially circular in shape and may have a diameter from 2 mm to 10 mm inclusive. In some embodiments, the contact lens/blank has a diameter from 13 mm to 15 mm, and the optic zone has a diameter from 7 mm to 9 mm. The contact lens/blank may have a convex anterior surface. The contact lens/blank may have a concave posterior surface and/or a convex anterior surface.

Figure 1B:
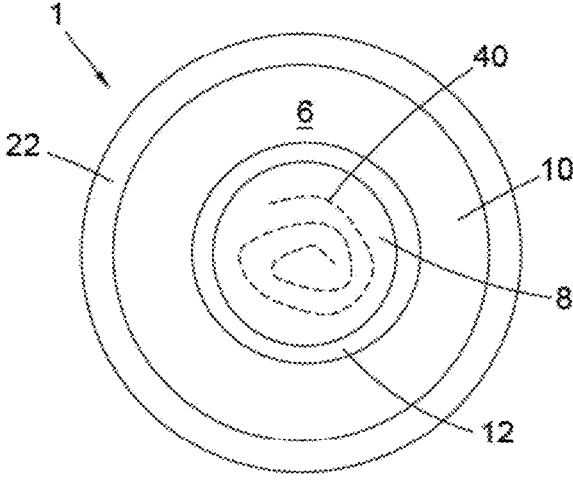
FIG. 1B shows a front view of the mandrel of FIG. 1A.

With reference to FIG. 1A and FIG. 1B, a first embodiment of the present disclosure is discussed. FIG. 1A, shows a schematic cross-sectional view of a mandrel 1. The mandrel comprises a stem 2 and a flange 4 at one end of the stem 2 and extending radially outward from the stem 2. The flange 4 defines part of a front surface 6 of the mandrel located on the opposite side of the flange 4 to the stem 2. The front surface 6 comprises a dome 8 and annular planar surface region 10 surrounding the dome 8. A drainage channel 12 extends around the base of the dome 8. A rim 22 extends around annular planar surface region 10. In FIG. 1A a contact lens member blank 16 is located on top of the front surface 6. The contact lens member blank 16 has an anterior surface comprising a bowl 18 surrounded by a peripheral flange 20. The dome 8 is located in the bowl 18 and the peripheral flange 20 contacts the annular planar surface region 10 in FIG. 1A. The contact lens member blank 16 comprises a spigot 14 extending upwards in FIG. 1A, away from the bowl 18 and peripheral flange 20. FIG. 1B shows a plan view of the mandrel 1 of FIG. 1A, without the contact lens member blank 16. A helical groove 40 (shown by a dashed line in FIG. 1B) is cut into the surface of the dome 8. It will be appreciated that other shapes of groove can be used.

In use, wax is applied to the dome 8. The contact lens member blank 16 is then pushed onto the wax, until the peripheral flange 20 is in contact with the annular planar surface region 10. The contact between the peripheral flange 20 and the annular planar surface region 10 may reduce the risk of and/or degree of misalignment between the contact lens member blank 16 and the mandrel 1. Wax located between the contact lens member blank 16 and dome 8 flows into and collects in drainage channel 12 as the contact lens member blank 16 is pushed onto the dome 8. Collection of wax in the drainage channel 12 reduces or prevents wax flowing onto the annular planar surface region 10, where the presence of wax could lead to misalignment between the contact lens member blank 16 and the mandrel 1. Reducing and/or preventing wax flowing onto the annular planar surface region 10 may also reduce the surface area of the contact lens member blank 16 that contacts the wax which in turn may reduce the region from which wax residue subsequently needs to be removed in any cleaning step. Deliberately roughening the surface of the dome 8 with helical groove 40 may increase the amount of wax held on the dome, and thereby further reduce and/or prevent the flow of wax on the annular planar surface region 10. While present embodiment has been described with reference to a contact lens member blank it will be appreciated that the disclosure may also find application with other types of ophthalmic lens member blanks.

Figures 2A, 2B:
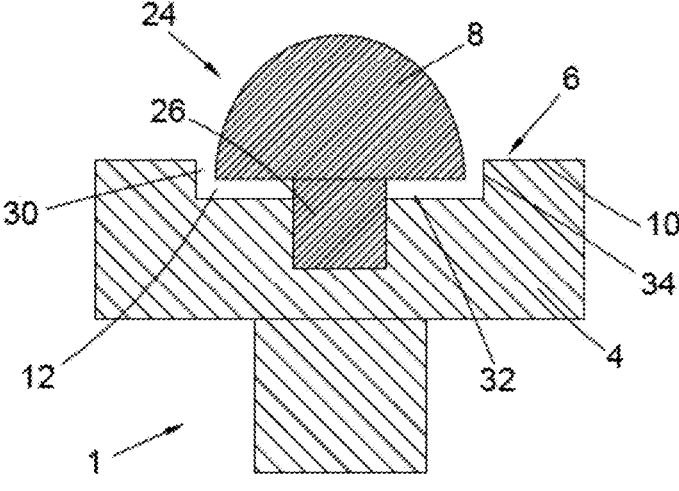
FIG. 2A shows a mandrel according to an embodiment of the disclosure.
FIG. 2B shows a front view of the mandrel of FIG. 2A.

With reference to FIG. 2A and FIG. 2B a second embodiment of the present disclosure is discussed. FIG. 2A shows a schematic cross-sectional view of a mandrel 1. Only those aspects of the second embodiment which differ with respect to the first embodiment will be discussed here. Like reference numerals have been used to denote like elements as between FIG. 1A and FIG. 2A (e.g. dome 8). In contrast to the first embodiment, the mandrel 1 of the second embodiment has a dome 8 formed as part of a separate center-piece 24. The front surface 6 comprises a cavity 30 that is cylindrical and centrally located on the flange 4. The extent of the cavity 30 is defined by sidewalls 34 and a base surface 32, which extends substantially parallel to the annular planar surface region 10. The cavity 30 and annular planar surface region 10 are concentric, with annular planar surface region 10 extending from the edge of cavity 30 to the edge of the flange 4. The center piece 24 comprises the dome 8 at one end, and a leg 26 extending away from the base 28 of the dome 8. The leg 26 is received in a centrally located socket formed in the flange 4 so that dome 8 sits partially within, and concentrically with, the cavity 30. The base 28 of the dome 8 is spaced apart from the front surface 6 and base surface 32. In FIG. 2A the drainage channel 12 is defined by the base surface 32 and sidewalls 34 of cavity 30 and the leg 26, and the drainage channel 12 extends underneath the dome 8. FIG. 2B shows a plan view of the mandrel 1 of FIG. 2A. Overflow channel 42 extends radially across the annular planar surface region 10 from drainage channel 12 to the edge of the flange 4.

Figure 3:
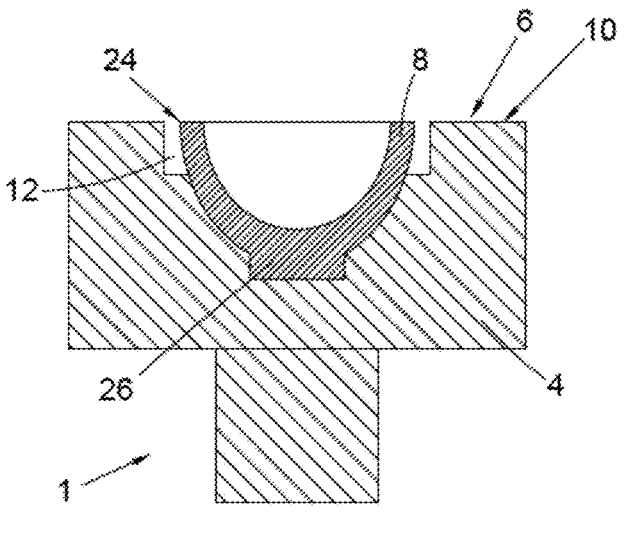
FIG. 3 shows a mandrel according to an embodiment of the disclosure.

FIG. 3 shows a schematic cross-sectional view of a mandrel 1 according to an embodiment of the present disclosure. Only those aspects of the third embodiment which differ with respect to the second embodiment will be discussed here. Like reference numerals have been used to denote like elements as between FIG. 2A and FIG. 3. In the embodiment of FIG. 3 the body 8 of center piece 24 defines a bowl, the other surface of the bowl defining part of the drainage channel 12. Thus, the third embodiment has a concave curved surface region.

Figure 4:
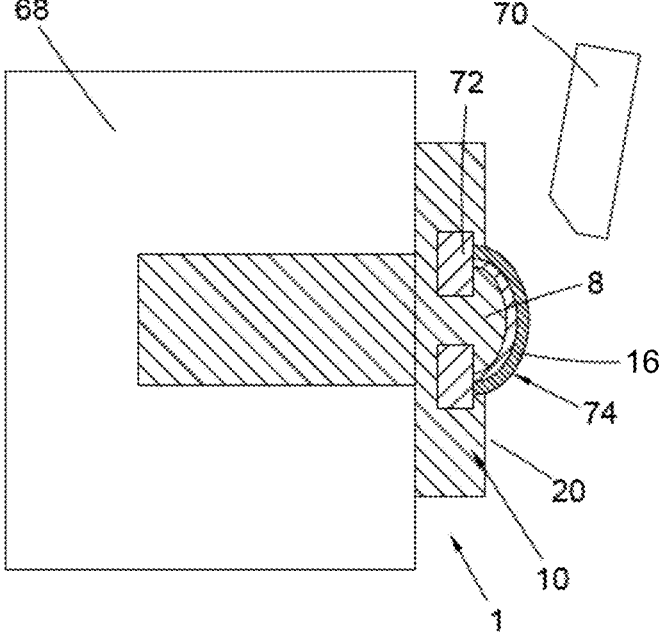
FIG. 4 shows a schematic cross-sectional view of a mandrel according to an embodiment of the disclosure with an ophthalmic lens member blank mounted thereon, the mandrel being mounted on a lathe for machining of the lens member blank.

FIG. 4 shows a mandrel 1 in accordance with an example embodiment of this disclosure mounted in a chuck 68 of a lathe (not shown) for cutting with cutting tool 70. Wax 72 covers dome 8 and fills the drainage channel. The lens member blank 16 of FIG. 4 differs in shape from the blank 16 of FIG. 1A and does not include a peripheral flange. The edges of the lens member blank 16 abuts the annular planar surface region 10. In use, the cutting tool 70 cuts the anterior surface 74 of the contact lens member blank 16. While FIG. 4 shows the mandrel 1 in a lathe, it will be appreciated that other machining operations can be carried out using the mandrel of the present disclosure, for example polishing and/or grinding.

Figure 5:
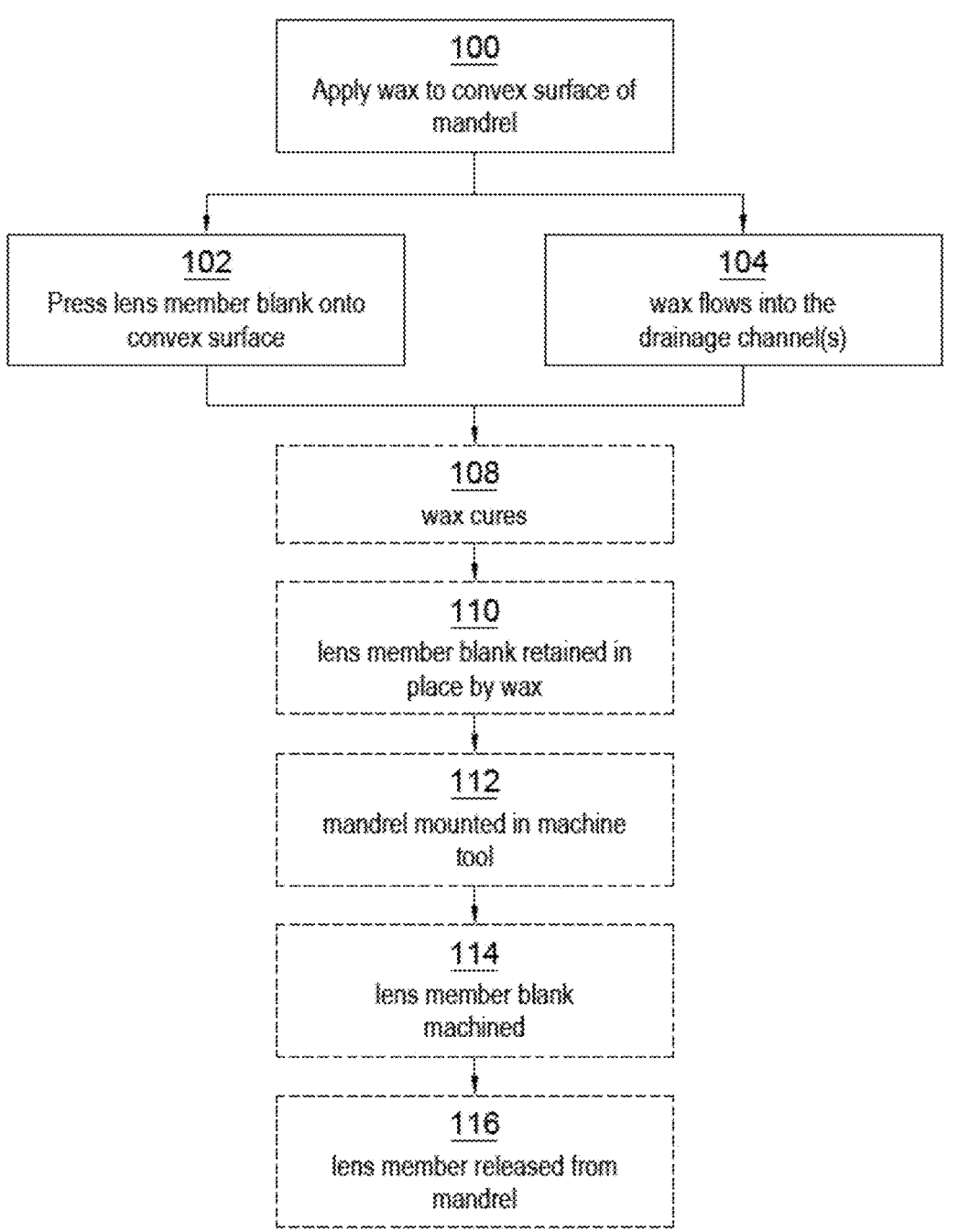
FIG. 5 shows a flow chart of a method of mounting an ophthalmic lens member blank on a mandrel in accordance with the present disclosure.

FIG. 5 shows a flow chart of an example method in accordance with the present disclosure. Wax is applied 100 to the convex surface of the mandrel. A lens member blank is the pressed 102 onto the convex surface, until the lens member blank abuts the planar surface of the mandrel. While the lens member blank is being pressed 102 onto the convex surface wax flows 104 into the drainage channel(s). Optionally, the method may include the following further steps (individually or in combination), with optional steps being indicated with a dashed line in FIG. 5. After the lens blank is pressed 102 onto the convex surface, and the wax flows 104 into the drainage channel(s), the wax is then allowed to cure 108. The lens is then released and the lens member blank is retained 110 in place by the wax. The mandrel is then mounted 112 in a lathe (or other machine tool), for example by the stem of the mandrel being received in a chuck of the lathe. The anterior surface of the lens member blank is then machined 114, for example cut. The lens member blank is then released 116 from the mandrel, for example by melting the wax.

Figures 6A, 6B, 6C:
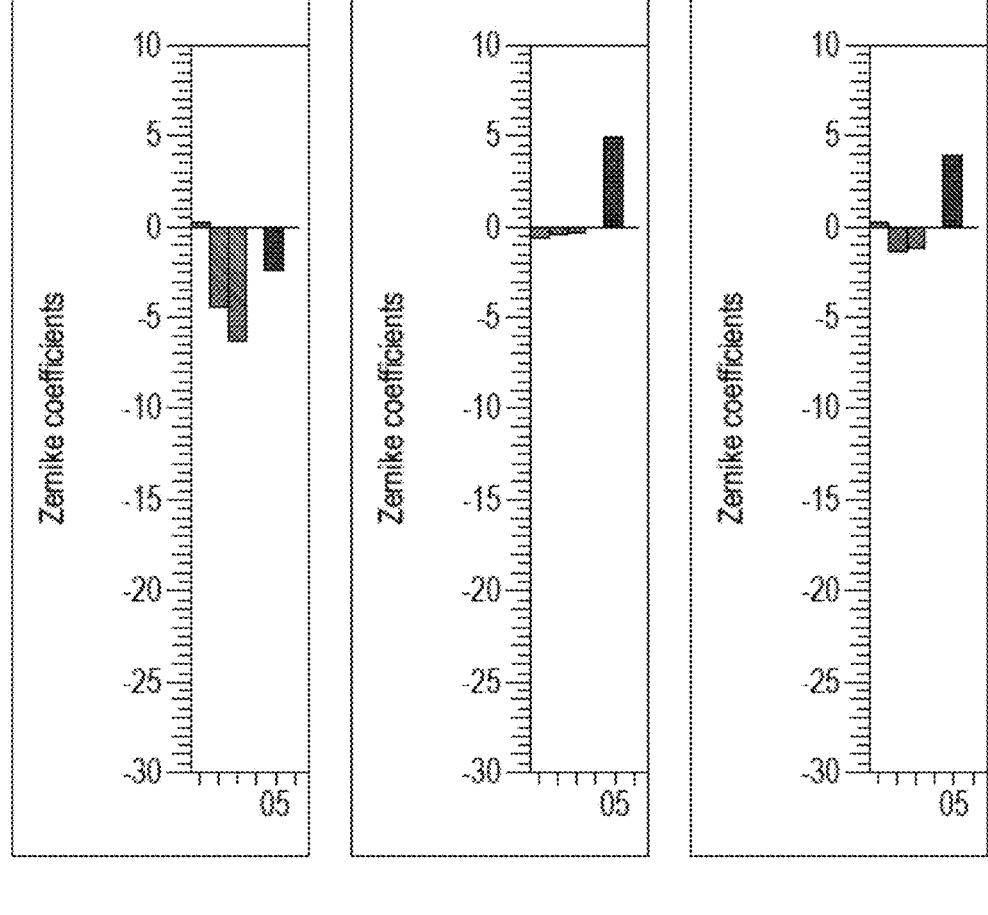
FIG. 6A shows values of Zernike coefficients of tilt and other low-order optical aberration terms for a lens member lathed using the previous (rod-like) mandrel.
FIG. 6B shows values of Zernike coefficients of tilt and other low-order optical aberration terms for a lens member lathed using the mandrel of the present disclosure, when the lens member has a concave region and peripheral flange.
FIG. 6C shows values of Zernike coefficients of tilt and other low-order optical aberration terms for a lens member lathed using the mandrel of the present disclosure, when the lens member has a concave region and no peripheral flange.

A previous method of machining a lens member blank involved using a wax block to mount the blank on a mandrel taking the form of a constant diameter rod with a domed end (i.e. without the planar surface and drainage channel of the present disclosure). Without wishing to be bound by theory, it is believed that this previous method had an increased risk of mounting the wax and/or blank out of position (e.g. off-centre or tilted). The resulting cutting errors are believed to cause an unwanted change in the thickness of the lens member from one side to the other, and this additional wedge-shape typically results in an optical tilt aberration in the finished lens. FIG. 6A shows values of Zernike coefficients of tilt and other low-order optical aberration terms for a lens member lathed using the previous (rod-like) mandrel. FIG. 6B and FIG. 6C shows values of Zernike coefficients of tilt and other low-order optical aberration terms for a lens member lathed using the mandrel of the present disclosure. FIG. 6B shows the values for a lens member having a concave region and peripheral flange and FIG. 6C shows the values for a lens member having a concave region and no peripheral flange. It can be seen that the values of the lower order coefficients are significantly lower in magnitude in FIG. 6B and FIG. 6C, thereby indicating that the mandrel of the present disclosure reducing cutting errors.

Figure 7:
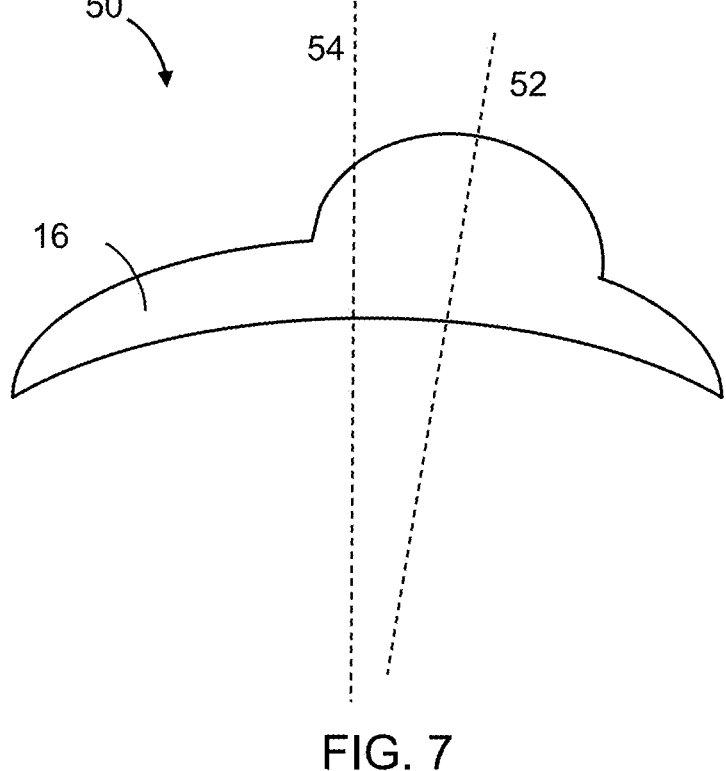
FIG. 7 shows a lens.

FIG. 7 shows an example of a lens 50 formed from a single lens member blank 16 machined using the prior art method in which the lens member blank is placed on a block of wax. The lens 50 includes an optic zone having rotational symmetry about optical axis 52. The edges of the lens 50 are rotationally symmetric about geometric axis 54. Due to a misalignment of the lens 50 with the rotational axis during machining, the optical axis 52 is out of alignment with the geometric axis 54.

Figure 8:
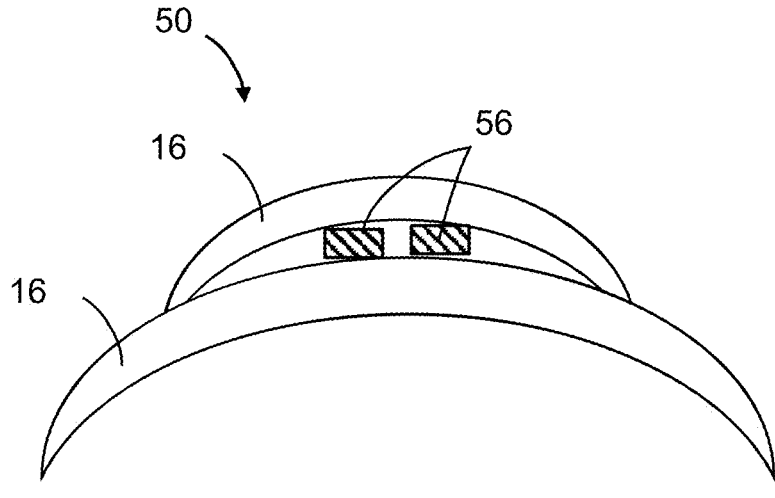
FIG. 8 shows a lens produced using the method of the disclosure.

FIG. 8 shows an example of a lens 50 comprising two lens members 16 having optical components 56 sandwiched there between.

Whilst the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. A mandrel and an ophthalmic lens member blank to be machined, the mandrel holding the ophthalmic lens member blank, the ophthalmic lens member blank having a surface comprising a curved surface region and a planar surface region, the mandrel having a front surface receiving the ophthalmic lens member blank to be machined; the front surface comprising;

a planar surface region of the mandrel abutting the planar surface region of the ophthalmic lens member blank;

a curved surface region of the mandrel with wax applied thereto, the ophthalmic lens member blank placed onto the wax; and a drainage channel extending along at least a portion of the boundary between the curved surface region of the mandrel and the planar surface region of the mandrel such that wax applied to the curved surface region flows into the drainage channel.

2. The mandrel and an ophthalmic lens member blank according to claim 1, wherein the curved surface region of the mandrel is convex and is centrally located on the front surface, and the planar surface region of the mandrel is annular and concentrically located with the curved surface region of the mandrel.

3. The mandrel and an ophthalmic lens member blank according to claim 1, wherein the curved surface region of the mandrel defines a dome, and the mandrel is configured such that the dome can be received in a concave recess defined by the posterior surface of an ophthalmic lens member blank while the ophthalmic lens member blank abuts the planar surface region of the mandrel.

4. The mandrel and an ophthalmic lens member blank according to claim 1, wherein the drainage channel extends along the whole of the boundary between the curved surface region of the mandrel and the planar surface region of the mandrel.

5. The mandrel and an ophthalmic lens member blank according to claim 1, wherein the mandrel comprises a stem and a flange extending radially from the stem at one end of the stem, a surface of the flange on the opposite side of the flange to the stem defining the planar surface region of the mandrel.

6. The mandrel and an ophthalmic lens member blank according to claim 5, wherein the flange and/or stem comprises a socket and the mandrel further comprises a center-piece comprising a body and a leg extending therefrom, the mandrel being configured such that when the leg is received in the socket a front body surface of the body defines the curved surface region of the mandrel.

7. The mandrel and an ophthalmic lens member blank according to claim 6, wherein the mandrel is configured such that when the leg is received in the socket the drainage channel is defined between the center-piece and the flange.

8. The mandrel and an ophthalmic lens member blank according to claim 1, wherein a portion of the drainage channel extends beneath the curved surface region of the mandrel.

9. The mandrel and an ophthalmic lens member blank according to claim 1, wherein the front surface comprises one or more overflow channels extending radially from the drainage channel to an edge of the flange.

10. The mandrel and an ophthalmic lens member blank according to claim 1, wherein the curved surface region of the mandrel has one or more grooves therein to retain wax.

11. The mandrel and an ophthalmic lens member blank according to claim 1, wherein the ophthalmic lens member blank is a contact lens member blank.

12. A kit of parts comprising the mandrel and an ophthalmic lens member blank according to claim 1, and further comprising a socket in the front surface for receiving a center-piece, the kit of parts further comprising one or more of the following: a center-piece comprising a body having a convex body surface, the center-piece being configured to be received in the socket such that the convex body surface defines the curved surface region of the mandrel; a center-piece comprising a body having a concave body surface, the center-piece being configured to be received in the socket such that the concave body surface defines the curved surface region of the mandrel.

13. A method of mounting an ophthalmic lens member blank on a mandrel for machining, the mandrel having a front surface comprising a planar surface region, a curved surface region and a drainage channel extending along at least a portion of the boundary between the curved surface region and the planar surface region, the ophthalmic lens member blank having a surface comprising a curved surface region and a planar surface region, the method comprising applying wax to the curved surface region of the mandrel and placing the ophthalmic lens member blank on the wax with the planar surface region of the ophthalmic lens member blank abutting the planar surface region of the mandrel, thereby causing wax to flow into the drainage channel from the curved surface region of the mandrel.

14. The method according to claim 13, wherein wax from the curved surface region of the mandrel is retained by the drainage channel such that no wax flows from the curved surface region of the mandrel to the planar surface region of the mandrel.

15. The method of machining an ophthalmic lens member blank, the method comprising mounting the ophthalmic lens member blank on a mandrel in accordance with the method of claim 13, and then mounting the mandrel on a machine tool and machining the ophthalmic lens member blank.

16. The method according to claim 13, wherein the ophthalmic lens member blank is a contact lens member blank.

17. The method according to claim 16, wherein the contact lens member blank is a rigid contact lens member blank.

18. The method according to claim 16, wherein the contact lens member blank is a soft contact lens member blank.

19. The method according to claim 18, wherein the soft contact lens member blank is a hydrogel contact lens member blank or a silicone hydrogel contact lens member blank.

\* \* \* \* \*